US012738162B2

(12) United States Patent
Lauzière et al.

(10) Patent No.: US 12,738,162 B2
(45) Date of Patent: Sep. 15, 2026

(54) SYSTEM AND METHOD TO IMPROVE INTERACTIVE GUIDANCE OF HEAVY VEHICLES IN URBAN AREAS

(71) Applicant: Niosense Inc., Laval (CA)

(72) Inventors: Patrick Lauzière, Laval (CA); David Préville, Repentigny (CA); Derreck Bélair, Saint-Jérôme (CA)

(73) Assignee: Niosense Inc., Laval (CA)

( * ) Notice: Subject to any disclaimer, the term of this patent is extended or adjusted under 35 U.S.C. 154(b) by 9 days.

(21) Appl. No.: 18/967,933

(22) Filed: Dec. 4, 2024

(65) Prior Publication Data

US 2025/0201121 A1 Jun. 19, 2025

Related U.S. Application Data

(60) Provisional application No. 63/611,844, filed on Dec. 19, 2023.

(51) Int. Cl.

| | |
|---|---|
| ***G08G 1/00*** | (2006.01) |
| ***G01C 21/34*** | (2006.01) |
| ***G05B 13/02*** | (2006.01) |
| ***G06N 3/0442*** | (2023.01) |
| ***G06N 3/084*** | (2023.01) |
| ***G08G 1/01*** | (2006.01) |
| ***G08G 1/0968*** | (2006.01) |

(52) U.S. Cl.

CPC ... *G08G 1/096844* (2013.01); *G01C 21/3415* (2013.01); *G01C 21/3461* (2013.01); *G05B 13/027* (2013.01); *G06N 3/0442* (2023.01); *G06N 3/084* (2013.01); *G08G 1/0112* (2013.01); *G08G 1/0125* (2013.01)

(58) Field of Classification Search

CPC ........... G08G 1/096844; G08G 1/0112; G08G 1/0125; G06N 3/0442; G06N 3/084; G01C 21/3415; G01C 21/3461; G05B 13/027

See application file for complete search history.

(56) References Cited

U.S. PATENT DOCUMENTS

| | | | | |
|---|---|---|---|---|
| 2009/0234577 A1* | 9/2009 | Rinscheid .......... | G01C 21/3415 701/533 |
| 2019/0113354 A1* | 4/2019 | Matsumura ............ | G01C 21/20 |
| 2019/0146508 A1* | 5/2019 | Dean .................... | G05D 1/0285 701/26 |
| 2019/0293443 A1* | 9/2019 | Kelly ................ | G01C 21/3415 |

(Continued)

*Primary Examiner* — Truc M Do

(74) *Attorney, Agent, or Firm* — Stratford Group Ltd.

(57) ABSTRACT

Described are various embodiments of a vehicle guiding system and method. In some embodiments, the system comprises an AI-augmented vehicle-specific constraints database combining multiple data sources and used for generating optimized routes. The system may further include an intermediate layer of links or interface configured to connect with known and new turn-by-turn driver tools/applications and allow the AI-augmented constraints database to be used. The system may be coupled with a plurality of telematics systems monitoring the vehicle to provide an independent feedback loop which allows the system to react in real-time, and establish performance metrics and measurements for invoicing and reporting purposes. In some embodiments, the system may be coupled to one or more traffic management subsystems or devices.

20 Claims, 7 Drawing Sheets

(56) References Cited

U.S. PATENT DOCUMENTS

| | | | | |
|---|---|---|---|---|
| 2019/0325746 | A1* | 10/2019 | Lewis | G08G 1/096872 |
| 2020/0011690 | A1* | 1/2020 | Becker | G01C 21/3453 |
| 2021/0232144 | A1* | 7/2021 | Lee | G06N 3/02 |
| 2022/0176962 | A1* | 6/2022 | Smith | B60W 30/18109 |
| 2023/0123323 | A1* | 4/2023 | Sharifi | G01C 21/3484 701/424 |

* cited by examiner

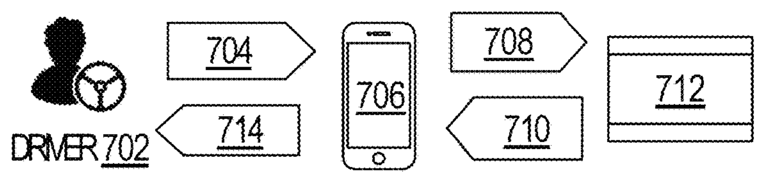
FIG. 7A
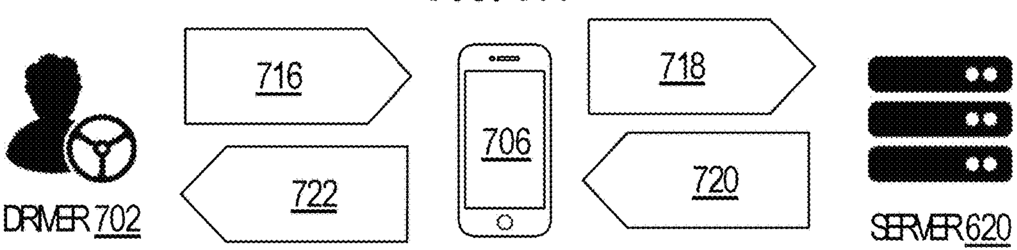
FIG. 7B
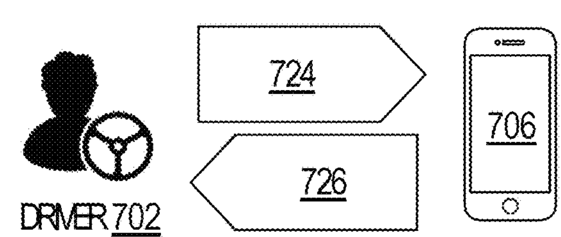
FIG. 7C
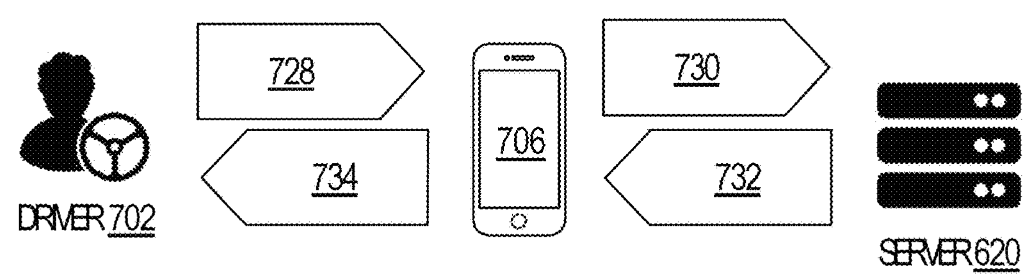
FIG. 7D
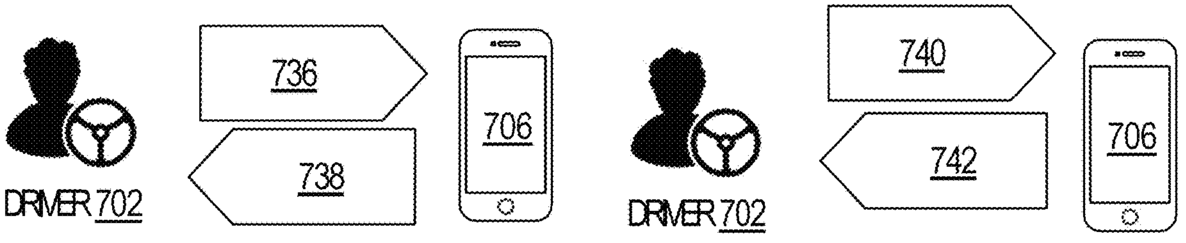
FIG. 7E
FIG. 7F

SYSTEM AND METHOD TO IMPROVE INTERACTIVE GUIDANCE OF HEAVY VEHICLES IN URBAN AREAS

CROSS-REFERENCE TO RELATED APPLICATIONS

This application claims the benefit of U.S. Provisional Patent Application No. 63/611,844, filed Dec. 19, 2023, which is incorporated herein by reference in its entirety.

FIELD OF THE DISCLOSURE

The present disclosure relates to vehicle traffic management and optimization, and, in particular, to a system and method to improve interactive guidance of heavy vehicles in urban areas.

BACKGROUND

Every time a truck has to drive in an urban area, it is faced with numerous challenges. These challenges include constraints such as regulations (allowed trucking roads), known geometric limitations and other dynamic constraints such as congestion, road works, dangerous situations or hazardous areas, and many more. Thus, truck drivers are faced with numerous challenges when navigating in urban area, and efficient navigation typically requires special tools. While many commercial applications are available to guide these vehicles, those applications have limitations.

For example, truck drivers typically receive a sequence of deliveries with geolocated destinations from a dispatch center and sometimes a suggested path to reach those destinations. Sometimes the suggested path was computed taking into account traffic and/or specific limitations of the selected vehicle. The quality of the guidance provided to drivers is directly related to the specific routing system and on-board guidance selected, with a few vendors dominating the market with end-to-end systems. The challenge that industry faces on a daily basis is to get access to the best routing, route optimization tools, while reaching all their drivers, who sometimes are on specific guidance systems (subcontractors) or may be independently operating with consumer-grade devices (owner-operators). Using optimal routes provides significant GHG emissions reductions as well as important cost savings to fleet owners and operators.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a vehicle guidance system and method that advantageously allows to decouple routing tools and driver interfaces, thereby providing a mixed-tools optimization using AI and other modern processing techniques to be combined with simple actions and existing interfaces known to users already disseminated in most mobile devices. The system and method further provides for an AI-augmented database that combines multiple data sources and is used for generating optimized routes, and for using telematics data to provide optimized routing solutions.

In accordance with one aspect, there is provided a method of routing a vehicle, comprising: receiving, at a server communicatively coupled to one or more user devices, an origin and a destination; determining, at the server, based on at least in part a plurality of constraints stored on one or more constraint databases communicatively coupled with the server, a route between said origin and destination optimized with respect to one or more optimization parameters; providing, by the server to a user device of a driver, said route; and driving, by the driver, the vehicle along said route.

In some embodiments, the providing is done by translating, by the server, said route into a plurality of waypoints; sending, from the server to a turn-by-turn application installed on a user device of a driver, via an interface, the plurality of waypoints.

In some embodiments, the method further comprises the steps of: receiving, at the server, from one or more telematics systems configured to monitor said vehicle traveling along said route, monitoring data of the vehicle along the route; and generating, by the server, one or more performance parameters based on said monitoring.

In some embodiments, the method further comprises the steps of communicating, by the server, with one or more traffic management subsystems; and wherein the one or more performance parameters include automatic traffic signal performance measures (ATSPMs).

In some embodiments, the one or more performance parameters are included in the one or more optimization parameters.

In some embodiments, the plurality of waypoints are dynamically spaced to minimize a number of updates.

In some embodiments, the plurality of waypoints are selected from a cache of waypoints to avoid a maximum number of waypoints limitation of the existing turn-by-turn application.

In some embodiments, the plurality of constraints include go-no go constraints and weighted segment constraints.

In some embodiments, one or more databases include an AI-augmented database combining multiple data sources.

In some embodiments, the one or more databases include labeled geolocated data and unlabeled geolocated data.

In some embodiments, the one or more databases include a synthesized base road and constraints information database that federates multiple sources of dynamic data associated with roads located in a defined geographical location.

In some embodiments, the one or more optimization parameters include one of: travel time, energy consumption, fuel consumption, distance travelled, number of stops made.

In some embodiments, the server further receives vehicle parameters and wherein the determination is based, at least in part, on the vehicle parameters.

In some embodiments, the vehicle parameters include a vehicle weight, vehicle size, or vehicle type.

In some embodiments, the one or more user devices are coupled to the server via a dedicated application installed on the one or more user devices.

In some embodiments, the one or more user devices are coupled to the server via a progressive web application (PWA).

In some embodiments, the server is further configured to meter or charge the driver based on a number of routes performed.

In some embodiments, the server is further configured to standardize multiple telematics data sources having different monitoring parameters into a single source of normalized data stored on the one or more databases.

In some embodiments, the different monitoring parameters include one of: latency, accuracy, or frequency.

In accordance with another aspect, there is provided a routing system, comprising: one or more constraint databases; a server communicatively coupled to the one or more constraint databases, and to one or more user devices, over a network, the server comprising a processor and a memory comprising instructions that when executed by the processor, make the processor automatically perform the steps of: receive, from the one or more user devices, an origin and destination; determine, based on at least in part a plurality of constraints stored on the one or more constraint databases, a route between said origin and destination optimized with respect to one or more optimization parameters; and transmit, by the server to a user device of a driver, said route.

In some embodiments, the server further comprises a stop avoidance module configured to receive and send data with one or more traffic management subsystems.

In some embodiments, the stop avoidance module further uses automated traffic signal performance measures (ATSPMs) to determine a performance; and wherein said performance is used as an optimization parameter.

In some embodiments, the one or more databases include a labeled database for training a machine learning algorithm via labeled constraint data, the machine-learning algorithm configured to perform said determination of said route.

In accordance with another aspect, there is provided a non-transitory medium storing instructions that, when executed by a processor, make the processor automatically perform the steps of: aggregate routing constraints stored on a plurality of databases into a same labelled constraint dataset; train a machine learning routing module on said same labelled constraint dataset; and generate, via said machine learning module, a route between an origin and a destination optimized with respect to one or more optimization parameters.

In some embodiments, the steps further include: receiving monitoring data from one or more telematics systems monitoring a vehicle travelling along said route; update the labelled constraint database by integrating the monitoring data therein; and re-train the machine learning routine module with the updated labelled constraint database.

In accordance with another aspect, there is provided a computer-implemented method of using an artificial intelligence (AI) model to detect road constraints for heavy vehicles comprising: training, by one or more processors, the AI model based on labeled constraint data and a selected training algorithm to generate a trained AI model; detecting one or more road constraints in road and constraints information related a defined geographical area comprising an origin and a destination using the trained AI model; and determining one or more routes between the origin and destination based at least in part on the detected one or more road constraints, and optimized with respect to one or more optimization parameters.

In some embodiments, the AI model comprises an Artificial Neural Network (ANN), and wherein the selected training algorithm includes a backpropagation algorithm and a gradient descent algorithm.

In some embodiments, the labeled constraint data comprises GPS data, and wherein the AI model comprises, at least in part, a gradient boosting classifier model trained to detect the one or more road constraints based on patterns in speed, acceleration, and/or bearing changes in the GSP data.

In some embodiments, the labeled constraint data comprises GPS data, and wherein the ANN is a Long Short-Term Memory (LSTM) neural network trained to detect the one or more road constraints in the GPS data.

In some embodiments, the labeled constraint data comprises satellite image data, and wherein the ANN is configured to implement a You Only Look Once (YOLO) object detection model trained to detect the one or more road constraints via one or more visual patterns in the satellite image data associated with heavy vehicle-specific road constraints.

In some embodiments, he labelled constraint data is divided into hard constraint data, and soft constraints data comprising weighted segments constraints.

In some embodiments, the method further comprises the steps of: translating, by the one or more processors, said route into a plurality of waypoints; and communicating, by the one or more processors, the plurality of waypoints, via a network, to a turn-by-turn application installed on a user device of a driver.

In some embodiments, the method further comprises the steps of: tracking, by the one or more processors via tracking data received from one or more vehicle telematics devices positionally coupled with a vehicle travelling along said route, a position of the vehicle; and sending, by the one or more processors, one or more control signals to one or more traffic management subsystems and/or traffic signals to avoid one or more stops by the vehicle.

In some embodiments, the method further comprises the steps of: tracking, by the one or more processors via tracking data received from one or more vehicle telematics devices positionally coupled with a vehicle travelling along said route, a position of the vehicle; and upon detecting, by the one or more processors, that the vehicle has left said route, generating one or more new routes incorporating the position of the vehicle.

In some embodiments, the method further comprises the steps of: tracking, by the one or more processors via tracking data received from one or more vehicle telematics devices positionally coupled with a vehicle travelling along said route, a position of the vehicle; and establish, by the one or more processors, based, at least in part, on said tracking data and said position of the vehicle, one or more performance metrics.

In accordance with another aspect, there is provided a non-transitory computer-readable storage medium having computer-executable instructions stored thereon, which when executed by one or more processors, cause the one or more processors to perform the operations comprising: training an AI model to detect road constraints for heavy vehicles based on labeled constraint data and a selected training algorithm to generate a trained AI model; detecting one or more road constraints in road and constraints information related a defined geographical area comprising an origin and a destination using the trained AI model; and determining one or more routes between the origin and destination based at least in part on the detected one or more road constraints, and optimized with respect to one or more optimization parameters.

Other aspects, features and/or advantages will become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein:

FIG. 4 is a schematic diagram illustrating in accordance with one embodiment.

FIGS. 6A-6E are schematic diagrams illustrating different types of interactions between users and the system of FIG. 2, in accordance with different embodiments; and FIGS. 7A-7F are schematic diagrams illustrating exemplary interactions between a driver and the system of FIG. 2, in accordance with one embodiment.

Figure 1:
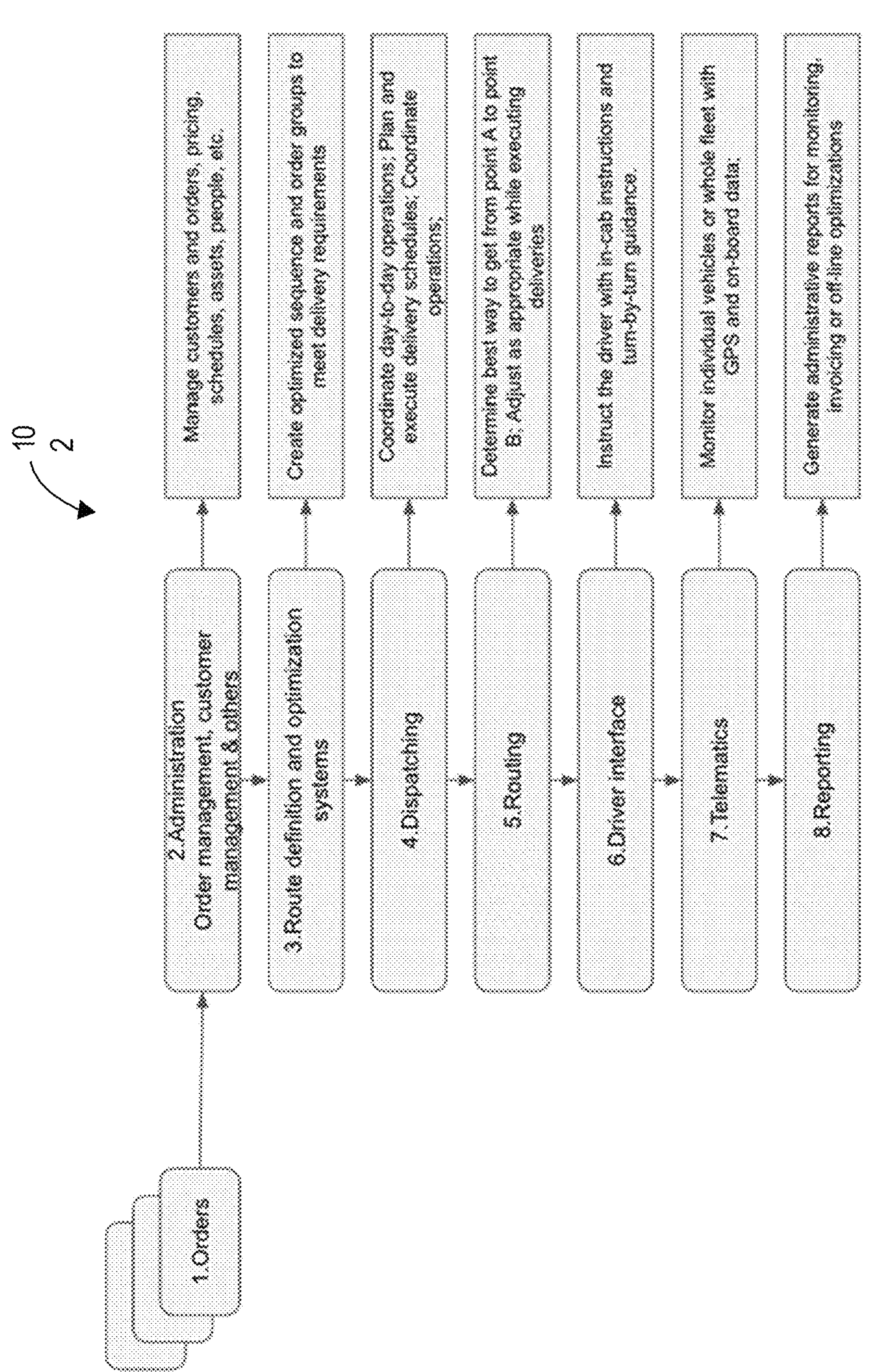
FIG. 1 is a schematic diagram of a delivery fleet management system, in accordance with one embodiment.

Elements in the several drawings are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The present disclosure relates to a vehicle guiding system and method, in accordance with different embodiments, which integrates both standard navigation constraints and hazardous location avoidance in a novel system architecture allowing use of classic management systems with added optimizations, performance measurements and related invoicing. Advantageously, the system and method may further comprise various tools and interfaces that enable system-wide optimization of routing for heavy vehicles in urban areas with back-end monitoring and feedback while leaving real-time routing instructions to standard interfaces (e.g., decoupling routing tools from the driver interface). Monitoring may include measuring the performance of routing and optimizations provided to derive environmental and operational reports.

In some embodiments, the system further provides dynamic interactions with traffic signals and other road infrastructures, to control or influence their timing or frequency, or to provide specific service levels based on vehicle size, priority, tolling or the type of cargo transported. The system and method advantageously offers an improvement over known interactive guidance systems used by heavy vehicles navigating urban areas.

Currently, truck drivers typically receive a sequence of deliveries with geolocated destinations from a dispatch center and sometimes a suggested path to reach those destinations. Sometimes the suggested path was developed taking into account traffic and-or specific limitations of the selected vehicle. The quality of the guidance provided to drivers is directly related to the specific routing system and on-board guidance selected, with a few vendors dominating the market with end-to-end systems. Some companies and drivers use generic, consumer-grade driving guidance such as Google Maps, Apple maps or OSMAND (based on Open Street Maps) and some others offer dedicated, industry specific tools with various levels of integration with dispatch, routing, tracking and the like.

Specialized systems do exist for optimizing routing using various algorithms and/or artificial intelligence. Using these systems in a vehicle requires a dedicated user interface, either through a web interface or an app on a mobile device. Routing interfaces are easily available in vehicles but are relatively limited: most users and especially independent truck operators fallback to common routing tools offering user interfaces such as Google Maps, Apple Maps, or Open Street Maps derivatives. These tools have been created with three typical business models in mind, and thus are optimized based on those: Dedicated pay-for-service systems offer routing to fleet owners and operators on a per-route or per-truck monthly basis Consumer-grade or generic systems offer routing to fleets indirectly through a free and universal application that generates revenues using the resale of mobility data or publicity Free, open-source systems offer free tools to anyone who wants to implement them, and third party resellers offer services to host the free solutions, generating revenues to data center operators or service resellers in the form of execution services Having an integrated set of tools that capture user needs end-to-end (routing plus user interface) limits the reach of high-end tools. Making advanced routing algorithms easily accessible is key to reaching a large number of drivers, allowing greater adhesion to rules and regulations, and reduced global externalities.

The system and method of the present disclosure allow, in accordance with various embodiments, to provide a vehicle guidance that advantageously allows to decouple routing tools and driver interfaces, thereby providing a mixed-tools optimization solution using AI and other modern processing techniques that combine simple actions and existing interfaces known to users already disseminated in most mobile devices. For example, in some embodiments, the system may be configured to provide optimized routing instructions to existing user interfaces-such as "turn-by-turn" applications, like as Google Maps, Apple Maps, or the like. Thus, in some embodiments, a driver or dispatcher may use the user interface of his or her choice, to access the improved routing system of the present disclosure.

In some embodiments, the system and method is further configured to measure the performance of routing and optimizations provided to derive environmental and operational reports and using said results to invoice for services based on results. The proposed approach uses a new system architecture that allows to reuse existing components and integrate them in an innovative way to maximize the capacity of adoption of optimization solutions, resulting in maximum environmental and operational impact at-scale.

Typical components of a delivery fleet management system Order management system or delivery management system (administration) Route definition and optimization system (operations) Dispatching system (operations planning and execution) Routing (operations planning and execution) Driver interface (execution) Telematics (monitoring) Reporting system (administrative & monitoring).

These tools have been created with three typical business models in mind, and thus are optimized based on those:

- Dedicated pay-for-service systems offer routing to fleet owners and operators on a per-route or per-truck monthly basis
- Consumer-grade or generic systems offer routing to fleets indirectly through a free and universal application that generates revenues using the resale of mobility data or publicity.
- Free, open-source systems offer free tools to anyone who wants to implement them, and third party resellers offer services to host the free solutions, generating revenues to data center operators or service resellers in the form of execution services Having an integrated set of tools that capture user needs end-to-end (routing plus user interface) limits the reach of high-end tools. Making advanced routing algorithms easily accessible is key to reaching a large number of drivers, allowing greater adhesion to rules and regulations, and reduced global externalities.

As a non-limiting example, a delivery fleet management system will comprise individual components that may or may not be supplied by the same provider. FIG. 1 shows a non-limiting exemplary list 102 of components typically found in a delivery fleet management system. These may include:

- an order management system or delivery management system (administration), which managers customers and orders, pricing, schedules, assets, people, etc.;
- a route definition and optimization system (operations), which typically is used to create optimized sequences and order groups to meet delivery requirements;
- a dispatching system (operations planning and execution), which typically is used to coordinate day-to-day operations; plan and execute delivery schedules; and coordinate operations;
- a routing system (operations planning and execution), which are typically used to determine a best way to get from point A to point B; the route being typically adjusted as appropriate while executing deliveries;
- a Driver interface (execution), which is typically used to instruct the driver with in-cab instructions and turn-by-turn guidance;
- one or more telematics systems (monitoring), which typically monitor individual vehicles or whole fleets with for example a GPS and on-board data; and
- a reporting system (administrative & monitoring), which is typically used to generate administrative reports for monitoring, invoicing or off-line optimizations.

Typically, such delivery fleet management systems will comprise individual components that may or may not be supplied by the same provider.

Figure 2:
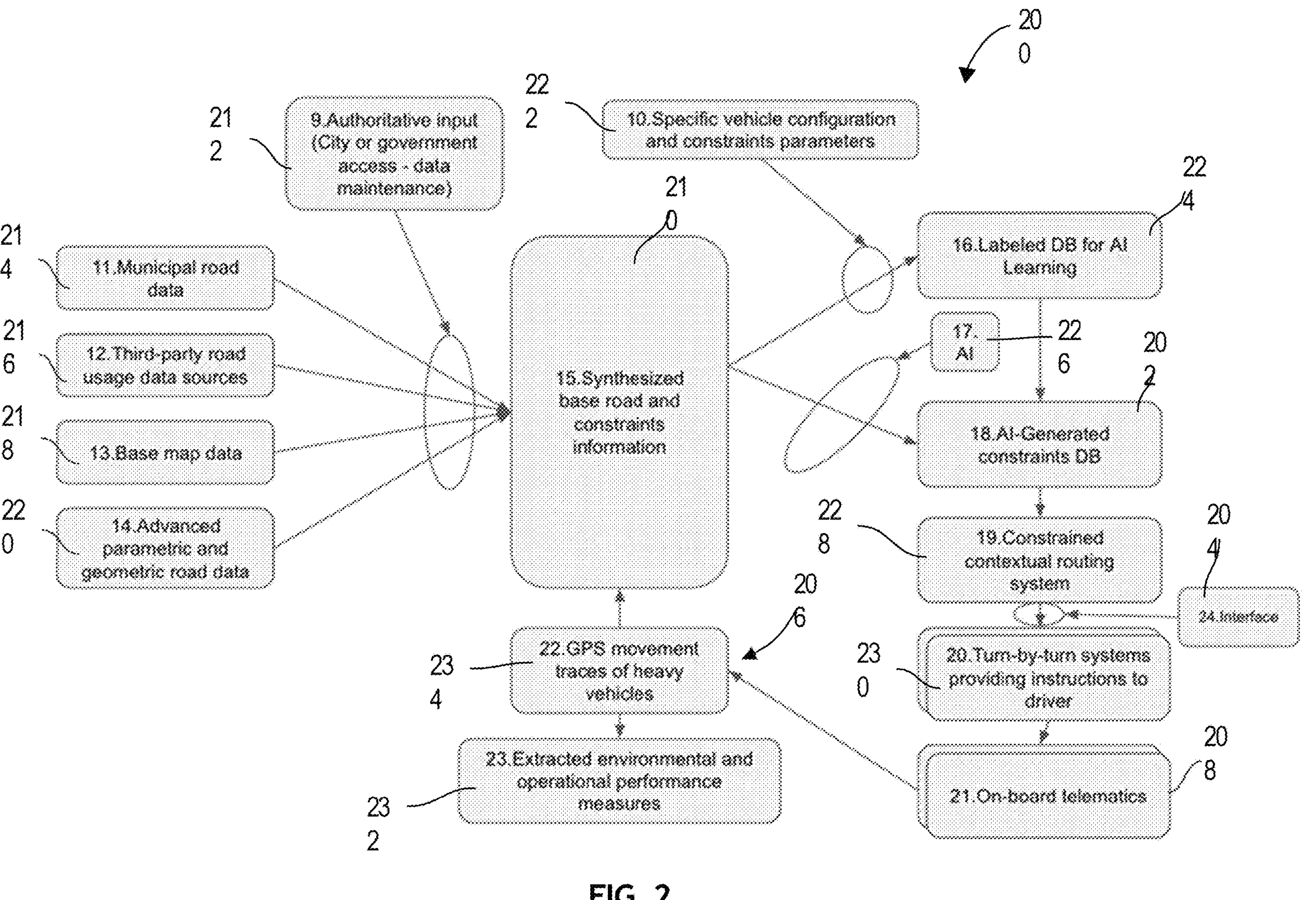
FIG. 2 is a schematic diagram illustrating a vehicle guiding system and method of the present disclosure, in accordance with one embodiment.

With reference to FIG. 2, and in accordance with one exemplary embodiment, a system 200 for decoupling of routing tools and driver interfaces, allowing for a mixed-tools optimization using AI and other modern processing techniques to be combined with simple actions and existing interfaces known to users already disseminated in most mobile devices.

In some embodiments, the system 200 may comprise the following three elements:

1. an AI-augmented vehicle-specific constraints database 202 combining multiple data sources and used for generating optimized routes;
2. an intermediate layer of links or interface 204 configured to connect with known and new turn-by-turn driver tools/applications and allow the AI-augmented constraints database to be used; and
3. an independent feedback loop 206 linked to a plurality of telematics systems 208 which allows the system 200 to react in real-time, and establish performance metrics and measurements for invoicing and reporting purposes.

As illustrated in FIG. 2, in some embodiments, a synthesized base road and constraints information or dataset 210 may generated by aggregating data from multiple sources, for example:

- authoritative inputs 212 (e.g., city or government access data or maintenance);
- municipal road data 214;
- third-party road usage data sources 216;
- base map data 218;
- advanced parametric and geometric road data 220.

In some embodiments, the telematics systems 208 may include, without limitation, smart phones, smart watches, tablets, computers, laptops, or dedicated GPS tracking devices, including SPOT™-enabled tracking devices or the like. In some embodiments, some of these devices may be installed on road-side hardware or equipment, or located on-board or near the target vehicle (for example by a smartphone of the driver of the target vehicle).

The synthesized base road and constraints information database 210 may be used to generate or extract specific vehicle configuration and constraints parameters 222 which may be stored in a labeled database 224 used for AI learning. Similarly, the synthesized base roads and constraints information 210 may be processed by one or more machine learning or AI methods 226 to generate, in some cases with the labeled database 224, the AI-augmented or generated constraints database 202.

In some embodiments, the AI-generated constraints database 202 is used by the constrained contextual routing system 228 to generate one or more routes. The routes are provided to a driver via the user interface 204 to an existing turn-by-turn system or tool 230 configured for providing instructions to the driver. In some embodiments, the on-board telematics systems 208 may be used to monitor GPS movement traces of heavy vehicles. These may be added to the synthesized base road and constraints information 210 and/or be used to extract environmental and operational performance measures 232.

In some embodiments, the system 200 comprises an interface operable to translate complex routing into a plurality of waypoints and makes them available to existing turn-by-turn routing tools. The system may further be configured to receive data from one or more telematics systems providing a feedback loop. In some embodiments, the system is configured to use one or more AI or machine learning techniques to augment hard constraint data. In some embodiments, the constraint database may be configured to federate or combine multiple sources of dynamic data relating to roads in a defined geographic area.

In some embodiments, a data normalization process is used to standardize multiple telematics sources having different parameters (e.g., accuracy, latency, frequency, vehicle type, etc.) into a single source of normalized data that can subsequently be used to (take action or generate insights).

In some embodiments, the system 200 may be configured to receive telematics data and analyze the telematics data to assess a performance. This performance assessment may be used to improve the routing and/or to provide performance-based invoicing or the like.

In some embodiments, the system 200 may be configured to optimize a route for maximum stop avoidance based on overall corridor performance or individual intersection performance or specific vehicle(s) performance.

In some embodiments, the system 200 may be configured to extract one or more routing constraints using AI and a subset of labeled and geolocated data plus a large quantity of unlabeled geolocated data.

In some embodiments, the system may be configured to generates progressive waypoints sent to traditional turn-by-turn driver interfaces to reuse it for guidance while using higher level routing optimizations. In some embodiments, dynamic spacing of waypoints may be used to minimize number of updates. In some embodiments, a cache of waypoints may be used to deal with a maximum of allowed waypoints set by the turn-by-turn guidance system or application.

In some embodiments, the system 200 may be configured to reuse the turn-by-turn guidance system as an embedded component in another mobile application on the on-board mobile device.

In some embodiments, the system 200 may comprise an interface that allows the driver to request routing from the central system using existing turn-by-turn guidance systems/applications/tools. For example, the system may be configured to receive from a driver a location via Google maps. The location being routed to one or more servers of the system, which in turn generates the route and send a link back for the driver to use.

In some embodiments, the system 200 may be configured to meter and charge the end user based on the number of routes performed.

In some embodiments, the system 200 may be configured to allow fleet management to authorize specific mobile devices assigned to vehicles or drivers.

In some embodiments, the system 200 may be configured to use PWA (progressive web apps) to confirm truck parameters before starting routing. In some embodiments, a traditional mobile application may be provided instead.

Automatic AI Extraction of Driving and Routing Constraints

Current routing systems are based on many input parameters. For example, truck routing is specifically challenging since it has to take into consideration various limitations attached to the movements of each vehicle type. Some restrictions also apply to various types of transportation, for example:

- some constraints are geometric: large trucks are not allowed on some roads; height limitations; width limitations; hill grade; turn radius, etc.;
- some other constraints are related to the traffic mix, conditions: pedestrian density; traffic density, etc.; and
- some are related to locations, with permanent or temporary contexts: proximity of residents; noise restrictions; accident-prone areas; school zones; authorized routes, etc.

Typical routing systems are good at using these parameters or databases when a labeled dataset is made available to the routing system. However, this information is often contained in disparate databases, and formatted or arranged in different non-compatible ways. In some embodiments, the system and method of the present disclosure allow the use of artificial intelligence to infer and automatically label those conditions based on minimal or extensive map data and available datasets. This allows to provide a unified constraint database that may then be used to provide improved routing instructions.

Intermediate Aggregation

In some embodiments, the system and method may allow to, using multiple databases and data sources, use AI and machine learning to derive a set of two independent routing limitations sorted in their own database:

1. "Go-No Go" constraints database; and
2. Weighed segments constraints database;

Using these two databases to route vehicles based on constraints without having to deal with all the independent parameters. In some embodiments, "Go-No Go" constraints include any hard constraint that prevents a route from going through a designated location. These may include, without limitation, rules and regulations (e.g., preventing a truck from using a road, etc.), the presence of blocked roads caused by weather events (earthquake, flood, landslide, presence of debris, etc.), accidents, etc. In contrast, weighted segment constraints are soft constraints that may still allow a route to pass through a given location or segment, but may have for example an associated weight that quantifies how effective or efficient the segment might be, which is taken into account during routing optimization.

Interface Subsystems to Existing Turn-by-Turn Systems (20)

In some embodiments, using multiple waypoints and other methods, the proposed system of the present disclosure may communicate with existing turn-by-turn systems and progressively guide the driver through the journey without having to take control of the mobile device that is on-board of the vehicle. For example, the system can publish a series of waypoints to Google maps or Apple maps, and those tools would then take over with traditional guidance.

In order to maintain detailed granularity, the interface may be configured to feed the waypoints to the existing application using advanced algorithms and methods, allowing essentially to soft force the route onto a subsystem without its knowledge of the overall route. This also can be done with one last waypoint always present, to maintain the ETA closer to reality.

Figure 3:
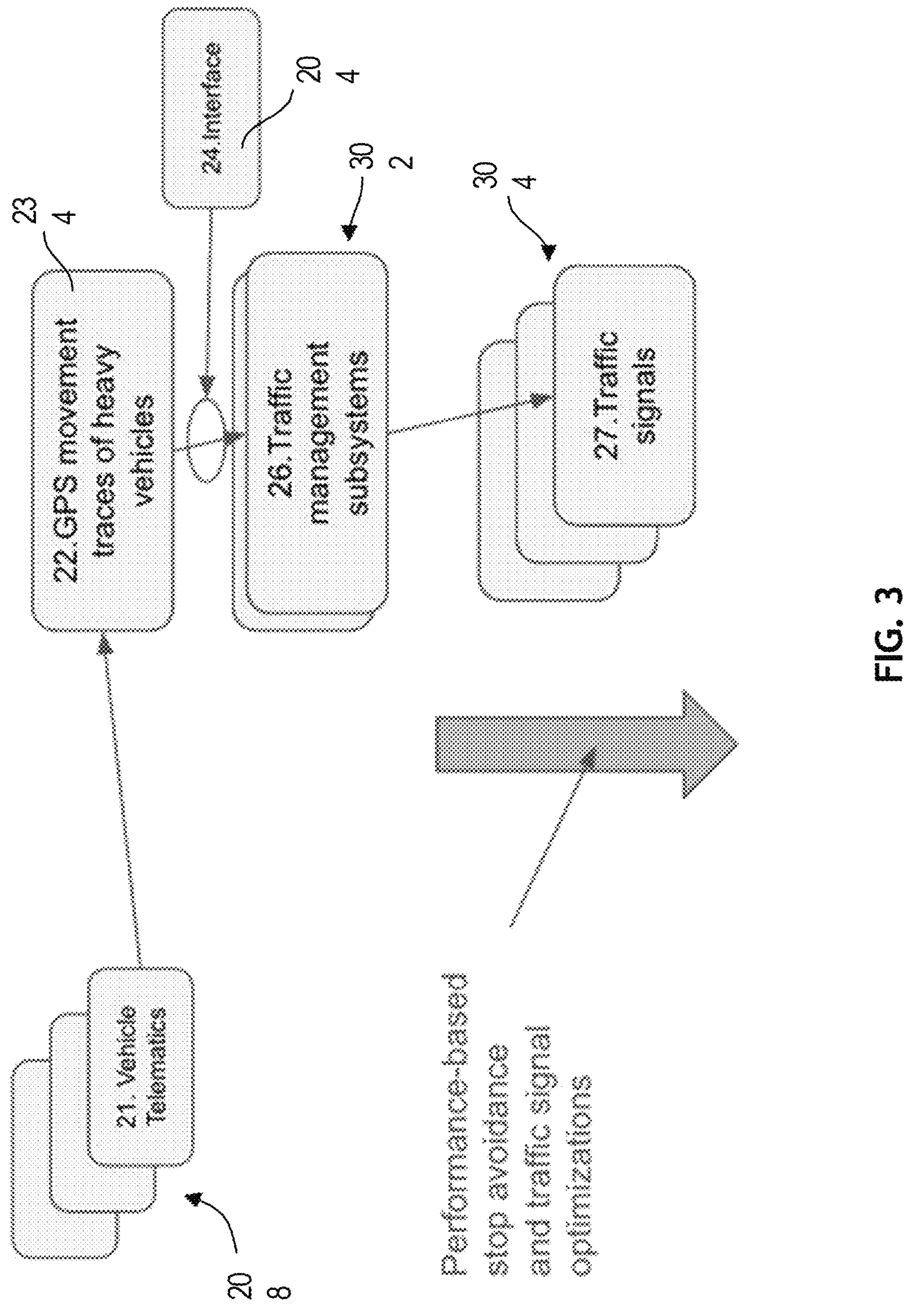
FIG. 3 and FIG. 4 are schematic diagrams illustrating exemplary interactions of the system of FIG. 2 with traffic management subsystems, in accordance with different embodiments.
Figure 4:
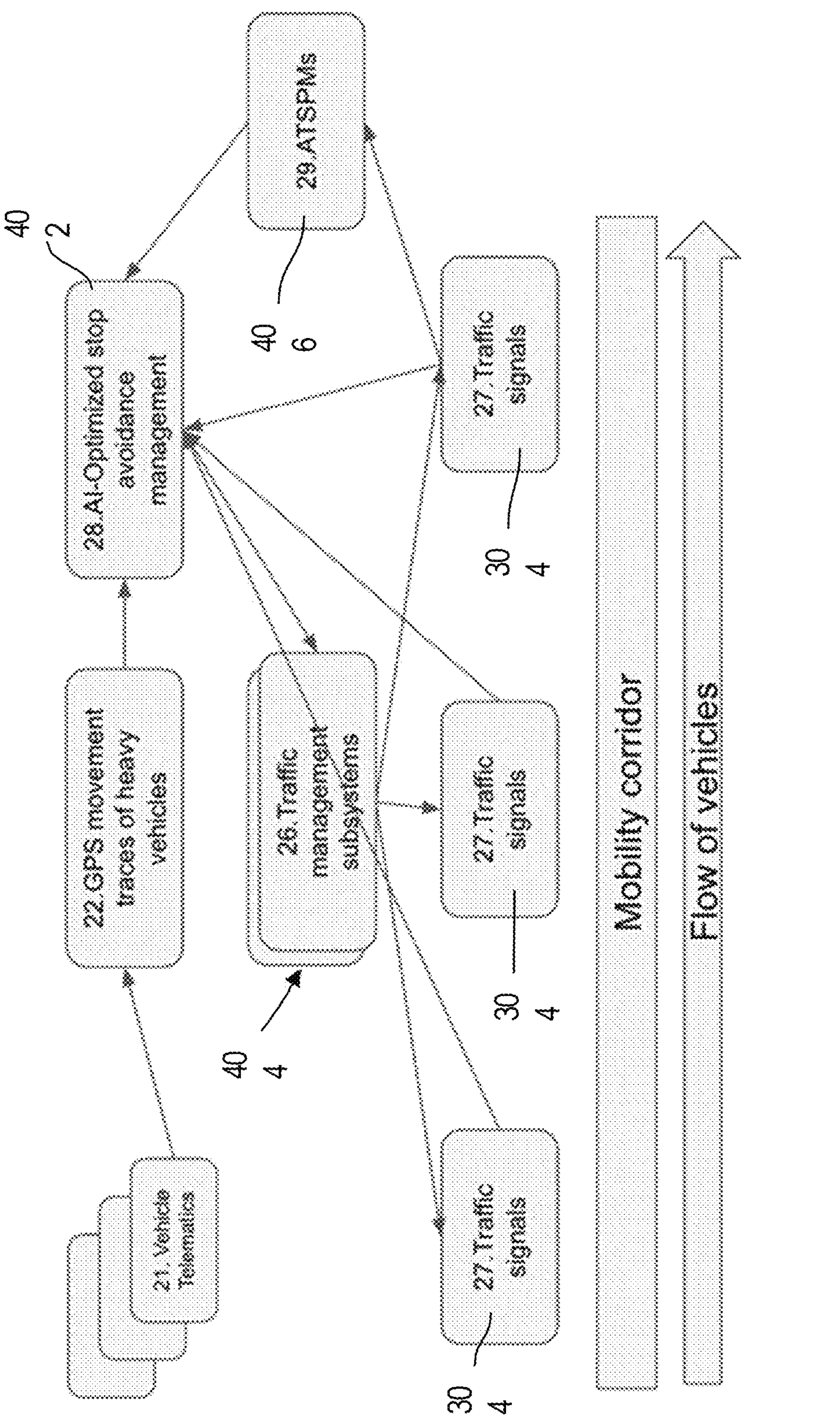

With reference to FIG. 3 and FIG. 4, and in accordance with one exemplary embodiment, the system 200 of FIG. 2 may further be configured to interact with existing road-side traffic management systems. For example, as mentioned above, the vehicle telematics 208 may be used to track GPS movement traces of the monitored heavy vehicles 234. However, this may further be used to send, via the interface 204 or a distinct interface, control signals to one or more traffic management subsystems 302 coupled to one or more traffic signals 304. This allows the system 200 to provide a performance-based stop avoidance and traffic signal optimizations.

Similarly, as illustrated in FIG. 4, the vehicle telematics 208 and GPS movement traces of heavy vehicles 234 may be used by an AI-optimized stop avoidance management system or module 402. The stop avoidance system or module 402 may be configured to receive and send data from/to the traffic management subsystems 404 and/or directly from the traffic signals 304. In some embodiments, the AI Optimized stop avoidance management system 402 may also use for example ATSPMs (automated traffic signal performance measures 406) to determine some aspects of performance.

Figure 5:
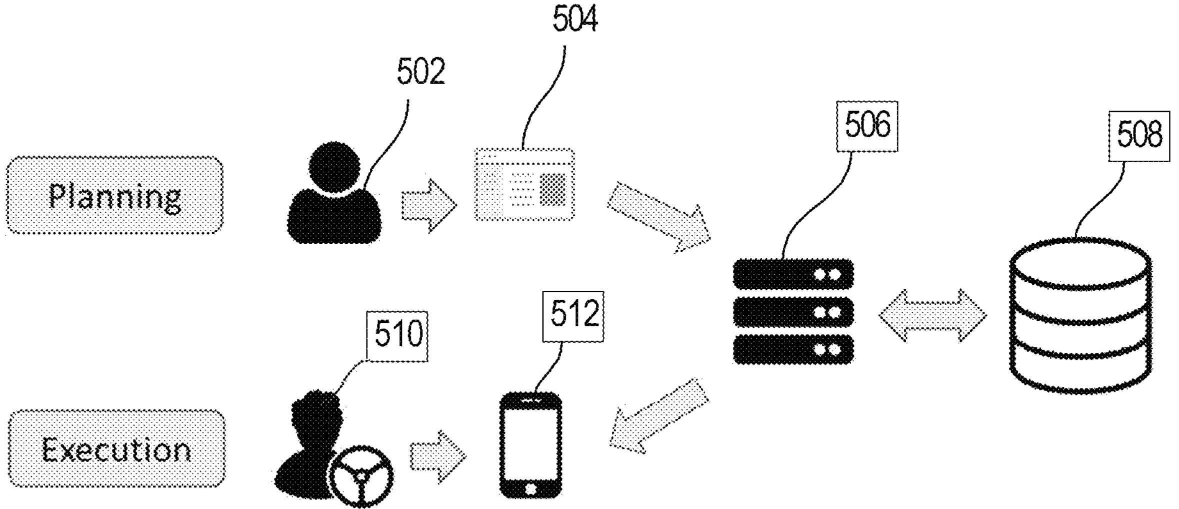
FIG. 5 is a schematic diagram illustrating an exemplary user interaction with the system of FIG. 2, in accordance with one embodiment.

In some embodiments, the system of the present disclosure may be configured to provide access to different types of users for planning and execution purposes. For example, FIG. 5 illustrates an example where a first user (e.g., dispatcher 502) uses first user interface 504 (such as a web interface, or interface provided via a dedicated application) to access one or more servers 506 of the system 200 via a network, the server 506 configured to be integrated with or coupled to one or more databases 508. The dispatcher 502 may use the system to generate one or more routes for a second user (e.g., driver 510). In turn, the generated routing information may be provided to the driver 510 via another interface located on a mobile device or user device 512 of the driver 510.

Other means of accessing and using the system may also be provided. For example, FIGS. 6A to 6D illustrate schematically different ways to access and use the system 200 of FIG. 2. For example, as shown in FIG. 6A, a user such as a dispatcher 602 may access the system by entering a web address (step 604) into an internet browser 606 of a user device to access (step 608) a web interface 610. An anonymous user session is activated (step 612), which is displayed (step 614) to the dispatcher 602 via the web interface 610. FIG. 6B illustrates an example where an itinerary/route is created using a web interface. To create an itinerary, the dispatcher 602 may enter (step 616) in the web interface 610 an origin and destination. In some embodiments, this may also include entering or selecting a vehicle type, vehicle dimensions and/or weight. In turn, the web interface 610 sends a request (step 618) to a server 620 to generate a route using the parameters submitted by the dispatcher 602. The server 620 sends back the route or directions (step 622) to the web interface 610, which outputs them graphically and/or textually (step 624) to the dispatcher 602. In FIG. 6C, the dispatcher 602 may select (step 626) in the web interface 610 that the generated route is output (step 628). This may be in the form of a printed document (e.g., PDF with a map and directions). This document may be downloaded to the dispatcher 602 computer and/or shared to another user. In some embodiments, as illustrated in FIG. 6D, sharing may be done by having the dispatcher 602 select or click on the web interface 610 (step 630) the web link be generated. The web interface 610 forwards the request (step 632) to the server 620, which generates and returns (step 634) the web link to the web interface 610 to be displayed (step 636) to the dispatcher 602.

Figure 6E:
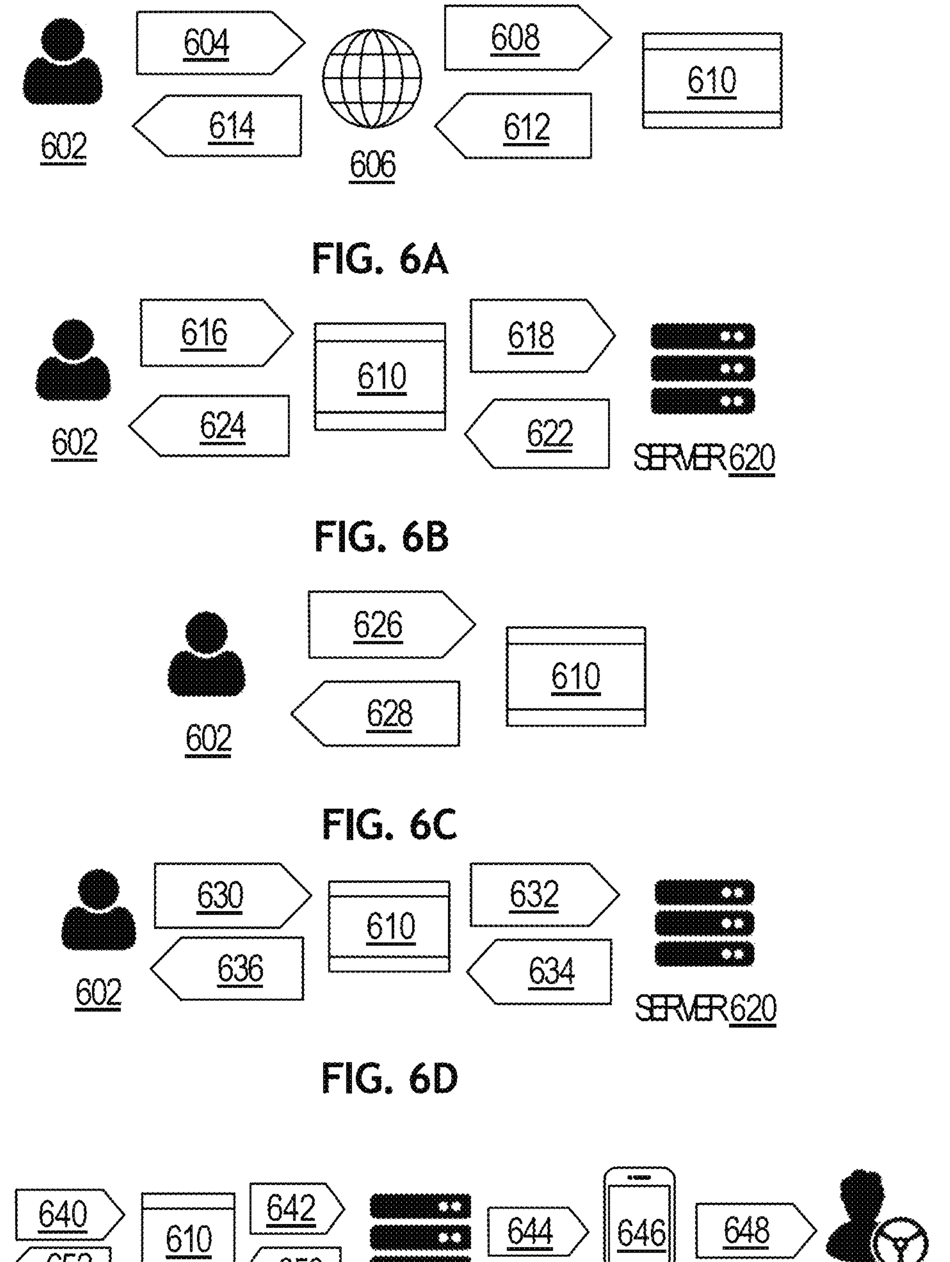

In some embodiments, as illustrated in FIG. 6E, the route may be generated by a first user (e.g., dispatcher 602) to be used by and sent to a second user (e.g., driver 638). In this example, the dispatcher 602 enters the coordinates or contact information of the second user the route is intended for (step 640) via the web interface 610. The contact information may include, for example, another account number, an email address, a cell phone number, etc. The web interface 610 sends the request (step 642) to transmit the route to the second user to the server 620, which in turn sends the route (step 644) to the driver 638 via, for example, an application located on the driver's user device 646 (step 648). At the same time, the server 620 may send to the web interface 610 a confirmation or notification that the route was sent (step 650) to be displayed to the dispatcher 602 (step 652).

In some embodiments, once a route has been generated, it can be accessed by a driver in different ways, as illustrated in FIGS. 7A-7F. For example, as illustrated in FIG. 7A, a driver 702 may open or click (step 704) on a user device (e.g., smart phone, etc.) a received or shared web link to a pre-generated route. If no dedicated application is installed on a user device 706 of the driver, the driver 702 may click or select the received or shared web link (step 708) via his or her user device 706 to open (step 710) an application store or the like 712 so that the dedicated application may be installed (step 714) on the user device 706.

However, if the application is already installed on the user device 706, as illustrated in FIG. 7B, the driver 702 may simply click or select the shared link (step 716) via the user device 706, which triggers the dedicated application to send (step 718) a request to receive the pre-generated route from the server 620. The server 620 returns the route information (step 720) and associated information to the user device 706, which displays a map and/or text to the driver 702 (step 722).

In some embodiments, as illustrated in FIG. 7C, the driver 702 may already have the dedicated application installed on the user device 706. In this case, the driver 702 may simply open the application (step 724) which will open an active session (step 726). Once the session is active, in some embodiments, to create a new route using the dedicated application, as illustrated in FIG. 7D, the driver 702 may enter (step 728) an origin point and destination point, and in some cases additional parameters such as a type of vehicle, its weight and/or dimensions. The application on the user device 706 makes a request (step 730) for directions or a route based on the parameters to the server 620, which returns a route or direction (step 732) to the user device 706, which displays it or them to the driver 702 (step 734).

To start the navigation, the user or driver 702 may accept or validate the proposed route (step 736) via the user device 706, which triggers the application to commence providing turn-by-turn directions based on the accepted route (step 738). Navigation will typically stop once the vehicle has reached its intended destination (step 740). The user device 706 may be configured to provide or display a navigation report, including, for example, a distance traveled, an estimation of GHG emitted, travel time, number of stops or the like (step 742).

In some embodiments, the web interface and/or dedicated application may initially provide the dispatcher and/or driver with information about the one or more routes. For example, parameters such as total distance, an estimation of GHG emission, travel time, a number of stops, energy or fuel consumption, or others may be presented. Some routes may be, for example, shorter or faster, but have higher fuel consumption. The dispatcher or driver may then opt to use different routes based on the optimization parameter that is most important at that time.

Returning to FIG. 2, and as noted above, system 200 may be configured to use, at least in part, an on-board telematics system 208 or similar for receiving GPS data from a dedicated GPS device or the like (e.g., GPS movement traces of heavy vehicles 234). In some embodiments, GPS data may include data elements such as, without limitation:

1) Latitude and longitude for determining a geographical position;
2) Speed of the vehicle, measured in units such as kilometers per hour or meters per second;
3) Acceleration defined as the rate of change of the speed (typically in meters per seconds squared);
4) Bearing, defined as a direction of travel (usually in degrees relative to the North);
5) Timestamps to associate each data point with a specific time.

In some embodiments, GPS data may be pre-processed using a number of techniques. For example, vehicle speed and acceleration may be normalized to a common scale (e.g., between 0 and 1) to ensure consistent feature ranges.

In some embodiments, new data elements (for example in the synthetized base-road and constraints database 210) may be created on the server by combining one or more data elements. For example, hard turns may be detected by identifying high acceleration with a rapidly changing bearing, each based on corresponding designated thresholds.

In some embodiments, the system 200 may be configured to apply one or more mathematical transformations to data in the one or more databases to remove the influence of vehicle orientation and approach vector. This allows identification of one or more constraints regardless of the direction from which the heavy vehicle approaches them. In some embodiments, the transformation may include rotating the coordinate system and/or using relative angles and distances.

In some embodiments, base map data 218 may comprise high-resolution satellite imagery covering a road network of interest. The satellite images may be divided into smaller tiles of a manageable size for faster processing.

In some embodiments, the constraints information 210 may be processed by one or more machine learning or AI methods 226 to generate, in some cases with the labeled database 224, the AI-augmented or generated constraints database 202. In the case of GPS data, a gradient boosting classifier machine learning technique may be trained on the preprocessed GPS data to identify one or more road constraints based on identified patterns in speed, acceleration, and bearing changes. It was found that this model excelled at capturing complex non-linear relationships between features.

In some embodiments, the one or more machine learning or AI methods 226 may comprise artificial neural networks (ANNs), including deep learning models such as recurrent neural networks (RNN), convolutional neural networks (CNNs) or similar. These models are trained on the labeled constraint database 224 to identify one or more constraints, and therefore configured to provide the AI-generated constraint database 202 used for routing. The skilled person in the art will appreciate that different frameworks (such as TensorFlow Keras) and/or libraries may be used to implement the one or more neural network models.

For example, in some embodiments a Long Short-Term Memory (LSTM) neural network may be implemented to process GPS data. LSTMs are particularly effective in analyzing sequential data like GPS tracks, capturing temporal dependencies and identifying constraints based on how vehicle dynamics evolve over time. In another example, satellite imagery may be processed using a YOLO (You Only Look Once) object detection model to analyze tiled satellite images. The model may be trained on a server to recognize one or more visual patterns associated with road constraints for heavy vehicles that are usually ignored or not taken into account by known routing methods and software. These may include, for example and without limitation:

- Sharp bends or curves by identifying tight turns with small radii;
- Narrow roads by detecting sections where the road width is significantly reduced;
- Low bridges or underpasses by locating structures with height restrictions;
- Steep grades by identifying sections with significant inclines or declines;
- Roundabouts by recognizing circular intersections; and/or
- Other obstacles or objects such as traffic islands, barriers, and/or construction zones (via the presence of objects such as barriers, construction cones, etc.) that may impede heavy vehicle movement.

In some embodiments, constraint identification may further use techniques such as data fusion where two or more outputs, for example from the GPS data models and the satellite imagery model, are combined to achieve a more robust and comprehensive identification of road constraints. In some embodiments, data fusion may be performed using, at least in part, a weighted average, a voting mechanism, and/or other fusion algorithms known in the art. These may be stored in the synthetized base road and constraints information database 210. Training of the one or more machine learning or AI methods 226 may be done via different training methods known in the art. For example, a conventional backpropagation algorithm and a conventional gradient descent algorithm may be used to train the neural network. Gradient descent is an optimization algorithm used to minimize differentiable real-valued multivariate functions. Gradient descent begins by initializing the values of parameters and then applying a gradient descent calculation, which uses mathematical calculations to iteratively adjust the values so they minimize a loss function to optimize the ANN. Backpropagation is the mathematical process of calculating the derivatives and gradient descent is the process of adjusting model parameters using the calculated derivatives to minimize the loss function. Backpropagation is a mathematical calculation for supervised learning of ANNs using gradient descent. Given an ANN and an error function, backpropagation is used to calculate the gradient of the error function with respect to the neural network's weights.

As noted above, the AI-generated constraints database 202 is used by the constrained contextual routing system 228 on server 620 (for example) to generate one or more routes. Different techniques may be employed to generate the routes once the constraints in the geographical area have been determined. These may include, alone or in combination and without limitation:

- the A* (pronounced "A-star") graph traversal and path-finding algorithm;
- Dijkstra's algorithm for finding the shortest paths between nodes in a weighted graph (e.g., a road network);
- a contraction Hierarchies (CH) algorithm; and/or
- genetic algorithms with fitness functions.

In some embodiments, the routing system 228 may employ other machine learning methods, for example those using reinforcement learning. One non-limiting example includes using neural combinatorial optimization methods. Other deep learning AI techniques such as graph neural networks may also be relied upon, where data points are treated as nodes linked by edges so that machine learning algorithms can make useful predictions at the level of nodes, edges or entire graphs (e.g., road networks).

In some embodiments, the contextual routing system or module 228 may generate new or additional routes on demand based on different circumstances. For example, the independent feedback loop 206 linked to a plurality of telematics systems 208 allowing system 200 to react in real-time may be implemented so that new routes are generated in-real time or in small intervals based on monitoring data received from the telematics systems. In some embodiments, the routing system 228 may be triggered to generate one or more new routes when the telematics or other sensors detect that the vehicle left the intended path.

Detection of constraints or obstacles for heavy vehicles navigating urban areas is an important task that benefits from identifying heavy-vehicle specific constraints that are typically not identified by known systems. As discussed above, routing systems, such as the one described herein in accordance with different embodiments can be substantially improved using the disclosed method of training and identifying heavy-vehicle related constraints. By automatically identifying heavy vehicle related constraints, transportation of goods in various industries can be improved, be it by providing various advantages such as faster travel time, minimizing a number of stops, minimizing energy/fuel consumption, etc. The described methods and systems thus provide a technical improvement over known methods and systems. Furthermore, the disclosed routing method and system can be tailored to inter-operate with different known turn-by-turn routing methods and systems, thereby improving them at the same time.

The present disclosure includes systems having processors to provide various functionality to process information, and to determine results based on inputs. Generally, the processing may be achieved with a combination of hardware and software elements. The hardware aspects may include combinations of operatively coupled hardware components including microprocessors, logical circuitry, communication/networking ports, digital filters, memory, or logical circuitry. The processors may be adapted to perform operations specified by a computer-executable code, which may be stored on a computer readable medium.

The steps of the methods described herein may be achieved via an appropriate programmable processing device or an on-board field programmable gate array (FPGA) or digital signal processor (DSP), that executes software, or stored instructions. In general, physical processors and/or machines employed by embodiments of the present disclosure for any processing or evaluation may include one or more networked or non-networked general purpose computer systems, microprocessors, field programmable gate arrays (FPGA's), digital signal processors (DSP's), micro-controllers, and the like, programmed according to the teachings of the exemplary embodiments discussed above and appreciated by those skilled in the computer and software arts. Appropriate software can be readily prepared by programmers of ordinary skill based on the teachings of the exemplary embodiments, as is appreciated by those skilled in the software arts. In addition, the devices and subsystems of the exemplary embodiments can be implemented by the preparation of application-specific integrated circuits, as is appreciated by those skilled in the electrical arts. Thus, the exemplary embodiments are not limited to any specific combination of hardware circuitry and/or software.

Stored on any one or a combination of computer readable media, the exemplary embodiments of the present disclosure may include software for controlling the devices and subsystems of the exemplary embodiments, for driving the devices and subsystems of the exemplary embodiments, for processing data and signals, for enabling the devices and subsystems of the exemplary embodiments to interact with a human user or the like. Such software can include, but is not limited to, device drivers, firmware, operating systems, development tools, applications software, and the like. Such computer-readable media further can include the computer program product of an embodiment of the present invention for preforming all or a portion (if processing is distributed) of the processing performed in implementations. Computer code devices of the exemplary embodiments of the present disclosure can include any suitable interpretable or executable code mechanism, including but not limited to scripts, interpretable programs, dynamic link libraries (DLLs), complete executable programs and the like. Common forms of computer-readable media may include, for example, magnetic disks, flash memory, RAM, a PROM, an EPROM, a FLASH-EPROM, or any other suitable memory chip or medium from which a computer or processor can read.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship with each other.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Information as herein shown and described in detail is fully capable of attaining the above-described object of the present disclosure, the presently preferred embodiment of the present disclosure, and is, thus, representative of the subject matter which is broadly contemplated by the present disclosure.

What is claimed is:

1. A computer-implemented method of routing vehicle comprising:

receiving, by one or more processors of a server communicatively coupled to one or more user devices, an origin and a destination associated with the vehicle;

accessing, by the one or more processors, a plurality of vehicle-specific routing constraints, wherein the plurality of vehicle-specific routing constraints:

are derived from a plurality of data sources and normalized, based at least in part on at least on one of: vehicle type, vehicle weight or vehicle size, into a unified constraint database, and are classified into hard constraints or weighted segment constraints;

determining, by the one or more processors, based at least on the plurality of vehicle-specific routing constraints, a route between the origin and destination based at least in part the plurality of vehicle-specific routing constraints, and optimized with respect to one or more optimization parameters;

translating, by the one or more processors, said route into one or more waypoints;

sending, by the one or more processors, the one or more waypoints to a turn-by-turn routing system thereby triggering the turn-by-turn routing system to provide guidance to a driver of said vehicle;

receiving, by the one or more processors, from one or more telematics systems configured to monitor said vehicle travelling along said route, monitoring data; and updating, by the one or more processors, at least a portion of the plurality of vehicle-specific routing constraints based on said monitoring data.

2. The computer-implemented method of claim 1, wherein at least a portion of the plurality of vehicle-specific routing constraints is generated or augmented using an artificial intelligence (AI) model comprising an Artificial Neural Network (ANN) trained via at least one of a back-propagation algorithm and a gradient descent algorithm.

3. The computer-implemented method of claim 1, further comprising the steps of:

sending, by the one or more processors, one or more control signals to one or more traffic management subsystems and/or traffic signals to avoid one or more stops by the vehicle along said route.

4. The computer-implemented method of claim 1, further comprising the steps of:

establishing, by the one or more processors, based, at least in part, on said monitoring, one or more performance metrics.

5. A non-transitory computer-readable storage medium having computer-executable instructions stored thereon, which when executed by one or more processors of a server communicatively coupled to one or more user devices, cause the one or more processors to perform the operations comprising:

receive, from the one or more user devices, an origin and a destination associated with the vehicle;

access a plurality of vehicle-specific routing constraints a plurality of vehicle-specific routing constraints, wherein the plurality of vehicle-specific routing constraints:

are derived from a plurality of data sources and normalized, based at least in part on at least on one of: vehicle type, vehicle weight or vehicle size, into a unified constraint database, and are classified into hard constraints or weighted segment constraints;

determine, based at least on the plurality of vehicle-specific routing constraints, a route between the origin and destination based at least in part on the plurality of vehicle-specific routing constraints, and optimized with respect to one or more optimization parameters;

translating said route into one or more waypoints;

sending the one or more waypoints to a turn-by-turn routing system thereby triggering the turn-by-turn routing system to provide guidance to a driver of said vehicle;

receiving from one or more telematics systems configured to monitor said vehicle travelling along said route, monitoring data; and updating at least a portion of the plurality of vehicle-specific routing constraints based on said monitoring data.

6. The non-transitory computer-readable storage medium of claim 5, wherein at least a portion of the plurality of vehicle-specific routing constraints is generated or augmented using an artificial intelligence (AI) model comprising an Artificial Neural Network (ANN) trained via at least one of a backpropagation algorithm and a gradient descent algorithm.

7. The non-transitory computer-readable storage medium of claim 5, wherein the operations further comprise:

sending, by the computer, one or more control signals to one or more traffic management subsystems and/or traffic signals to avoid one or more stops by the vehicle along said route.

8. The non-transitory computer-readable storage medium of claim 5, wherein the operations further comprise:

establish, based, at least in part, on said monitoring data and said position of the vehicle, one or more performance metrics.

9. The computer-implemented method of claim 1, wherein the weighted segment constraints each have an associated weight quantifying how efficient a segment is along said route for said at least one of: vehicle type, vehicle weight or vehicle size.

10. The computer-implemented method of claim 1, wherein said weighted segment constraints include at least one of: sharp bends or curves, narrow roads, inclines or declines, circular intersections, traffic islands, construction zones.

11. The computer-implemented method of claim 1, wherein the hard constraints include at least one of: rules and regulations, road blockage, or accidents preventing said route from going through a designated location for said at least one of: vehicle type, vehicle weight or vehicle size.

12. The computer-implemented method of claim 1, the one or more waypoints are sent from a cache of waypoints to avoid a maximum number of waypoint limitation set by the turn-by-turn guidance system.

13. The computer-implemented method of claim 1, wherein the one or more waypoints are dynamically spaced to minimize a number of updates.

14. The computer-implemented method of claim 1, wherein the one or more optimization parameters include one of: energy consumption, fuel consumption, distance travel or number of stops.

15. The non-transitory computer-readable storage medium of claim 5, wherein the weighted segment constraints each have an associated weight quantifying how efficient a segment is along said route for said at least one of: vehicle type, vehicle weight or vehicle size.

16. The non-transitory computer-readable storage medium of claim 5, wherein said weighted segment constraints include at least one of: sharp bends or curves, narrow roads, inclines or declines, circular intersections, traffic islands, construction zones.

17. The non-transitory computer-readable storage medium of claim 5, wherein the hard constraints include at least one of: rules and regulations, road blockage, or accidents preventing said route from going through a designated location for said at least one of: vehicle type, vehicle weight or vehicle size.

18. The non-transitory computer-readable storage medium of claim 5, wherein the one or more waypoints are sent from a cache of waypoints to avoid a maximum number of waypoint limitation set by the turn-by-turn guidance system.

19. The non-transitory computer-readable storage medium of claim 5, wherein the one or more waypoints are dynamically spaced to minimize a number of updates.

20. The non-transitory computer-readable storage medium of claim 5, wherein the one or more optimization parameters include one of: energy consumption, fuel consumption, distance travel or number of stops.

* * * * *